(12) United States Patent
Edwards et al.

(10) Patent No.: US 7,251,824 B2
(45) Date of Patent: Jul. 31, 2007

(54) ACCESSING A PRIVATE NETWORK

(75) Inventors: James W. Edwards, Portland, OR (US); Gavin S. Redshaw, Beaverton, OR (US); Walter Lara, Hillsboro, OR (US); Ajay Garg, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 09/741,406

(22) Filed: Dec. 19, 2000

(65) Prior Publication Data

US 2002/0078379 A1 Jun. 20, 2002

(51) Int. Cl.
*H04L 9/00* (2006.01)
*G06F 15/16* (2006.01)
*G06F 21/20* (2006.01)

(52) U.S. Cl. ............... 726/4; 726/12; 726/14; 709/227; 709/245

(58) Field of Classification Search ........ 713/200–202; 709/200, 220, 223, 225, 227–230, 238, 245
See application file for complete search history.

(56) References Cited

U.S. PATENT DOCUMENTS

| | | | | |
|---|---|---|---|---|
| 6,104,716 A | * | 8/2000 | Crichton et al. | 370/401 |
| 6,173,399 B1 | * | 1/2001 | Gilbrech | 713/153 |
| 6,178,455 B1 | * | 1/2001 | Schutte et al. | 709/228 |
| 6,208,656 B1 | * | 3/2001 | Hrastar et al. | 370/401 |
| 6,226,751 B1 | * | 5/2001 | Arrow et al. | 713/201 |
| 6,249,523 B1 | * | 6/2001 | Hrastar et al. | 370/401 |
| 6,272,150 B1 | * | 8/2001 | Hrastar et al. | 370/486 |
| 6,308,328 B1 | * | 10/2001 | Bowcutt et al. | 725/111 |
| 6,317,838 B1 | * | 11/2001 | Baize | 713/201 |
| 6,324,648 B1 | * | 11/2001 | Grantges, Jr. | 713/201 |
| 6,405,253 B1 | * | 6/2002 | Schutte et al. | 709/228 |
| 6,519,224 B2 | * | 2/2003 | Hrastar et al. | 370/227 |
| 6,529,517 B2 | * | 3/2003 | Hrastar et al. | 370/401 |
| 6,618,353 B2 | * | 9/2003 | Merrill et al. | 370/225 |
| 6,701,437 B1 | * | 3/2004 | Hoke et al. | 713/201 |
| 6,922,412 B2 | * | 7/2005 | Hrastar et al. | 370/401 |

FOREIGN PATENT DOCUMENTS

EP 1 280 300 A2 * 7/2002

* cited by examiner

*Primary Examiner*—Christopher Revak
(74) *Attorney, Agent, or Firm*—Fish & Richardson P.C.

(57) ABSTRACT

Accessing a private network includes receiving a request from a device across a public network at a first network component to establish a connection between the device and a private network and determining if the device is authorized to connect with the private network. If the device is authorized, the request is forwarded from the first network component to a second network component and the second network component creates a temporary connection between the private network and the device via the first network component.

35 Claims, 4 Drawing Sheets

ACCESSING A PRIVATE NETWORK

BACKGROUND

This invention relates to accessing a private network.

Small office/home office (SOHO) and residential computers may permanently connect to external networks such as the Internet via broadband connections. The computers within a SOHO or a residential environment can be connected together by private networks to share resources including the broadband connection. A private network can be connected to the broadband connection via a gateway device such as a personal computer running gateway software or a special purpose gateway device.

Such gateways can use Network Address Translation (NAT) to map connections from within the private network to connections outside the network to the Internet. NAT allows the private network to set up one set of Internet Protocol (IP) addresses for use on the private network and another set of IP addresses for use on the Internet. With NAT using different IP addresses inside and outside the private network, networked devices outside the private network may have difficulty connecting to the private network using proper addressing.

The IP addresses for use on the private network are reserved IP addresses set aside for use on the private network and are not valid routable IP addresses on the Internet. If one of these reserved IP addresses appeared in a packet at an Internet-based router, the router would drop the packet.

Further, the broadband connection may be provided by an Internet Service Provider (ISP) that prevents or hinders devices on the Internet from connecting to the private network. The ISP may dynamically assign an IP address to a contact point within the private network, such as the gateway device, rather than allocate persistent IP addresses to the devices within the private network. Without a persistent IP address being assigned to the gateway device, devices on the Internet may have difficulty locating, and therefore accessing, the private network at the proper Internet IP address.

DESCRIPTION

Figure 1:
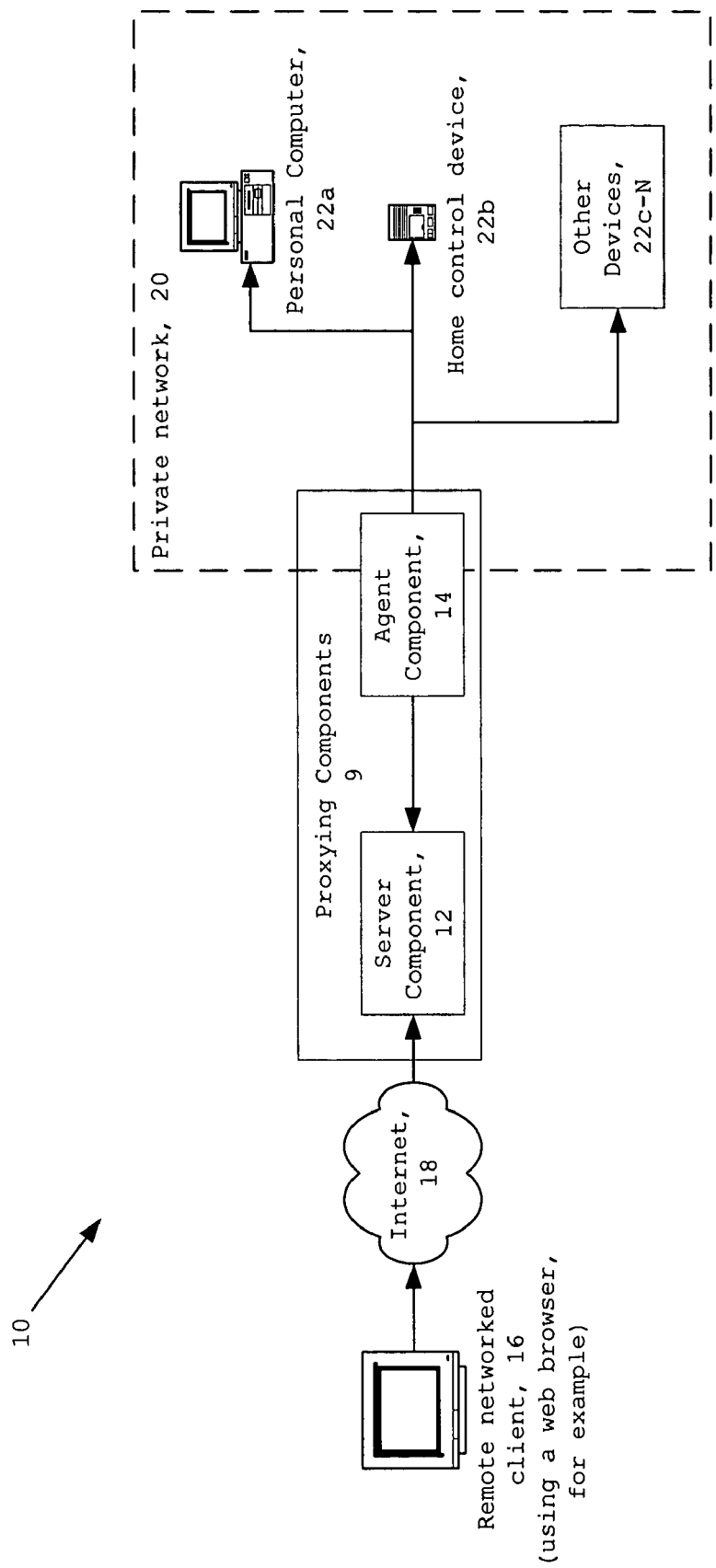
FIGS. 1-3 are block diagrams of computer networks in accordance with embodiments of the invention.

Referring to FIG. 1, a network configuration 10 includes proxying components 9 that enable a remote networked client (or agent) 16 connected to an external network such as the Internet 18 to connect into a private network 20. The proxying components 9, which include the server component 12 and the agent component 14, can facilitate the establishment of logical connections between the client 16 and the devices 22a-22N in the private network 20. The agent component 14 can initiate a connection to the server component 12, and can keep the connection active. The client 16, via a network application, can establish a logical network connection to a device 22 included in the private network 20 by first establishing a physical network connection to the server component 12. The agent component 14 previously established a persistent physical connection to the server component 12, so any requests sent by the client 16 to the server component 12 can be routed by the server component 12 to the agent component 14. The agent component 14 knows through a software mechanism which of the devices 22a-N included in the private network 20 are listening for network connections, so the agent component 14 can determine if one of the listening devices 22 can handle the client's request. If so, then a logical connection between the client 16 and that listening device 22 is established and network packets may be routed between the client 16 and that listening device 22 as if the client 16 and that listening device 22 were directly connected with a physical network connection.

The client 16 can be any device capable of communicating with an external network such as a desktop computer, mobile computer, telephone, personal digital assistant, or pager. The private network 20 can be a secure network, e.g., a network protected by one or more security mechanisms such as one or more firewalls and/or bastion hosts. The client/agent's connection to the private network 20 enables the client 16 to securely access and use devices 22a-N included in the private network 20. The directional arrows in FIG. 1 indicate the directions in which network connections in the network configuration 10 are initiated in order to support a logical connection from the client 16 to any one of the devices 22a-N.

Once connected to a device 22, the client 16 can use the device 22 as if the client 16 was not remote and was located in the private network 20, i.e., the client 16 can access any applications, programs, and capabilities of the accessed device 22 that are listening for network connections such as word processing, document editing, file deletion, printing, notifications, calendars, telephone messaging, electronic mail, file sharing, and faxing. The client 16 may be able to access stored data sets and other applications, programs, and capabilities of the accessed device 22 via an agent (not shown) running on the accessed device 22. The devices 22a-N can vary in type and include any devices capable of directly communicating with an external network and/or communicating with the external network through one or more other devices.

The proxying components 9 here act independently of any gateway or security protection, e.g., firewall, on the private network 20 and of any services provided by an ISP providing Internet access to the private network 20. (For clarity, no gateway or security protection is shown in FIG. 1.)

The server component 12 allows the client 16 to connect over at least two networks, e.g., the Internet 18 and the private network 20, via Internet protocols such as hypertext transfer protocol (HTTP), secure HTTP (HTTPS), and file transfer protocol (FTP). The server component 12 also provides for a temporary connection, e.g., a virtual connection path, to other clients/agents using any type of web browser, e.g., Netscape Navigator™ and Microsoft Internet Explorer™. The client 16 need not use a web browser, however. The client 16 can run any network application or component that established network connections to other peers as part of its normal functionality.

The server component 12 supports use of user accounts and passwords to provide a context for matching clients/agents. In this way, the server component 12 can be responsible for authentication for access to the private network 20. Alternatively, the server component 12 may pass on the client/agent matching functionality to the agent component 14 so that the agent component 14 provides for the authentication and controls the client's access into the private network 20.

The agent component 14 connects to the server component 12 and maintains a long-standing (persistent) connection with the server component 12 that can be used for subsequent data exchange. A long-standing connection exists between the components 12, 14 for as long as software for supporting their connection remains running on both components 12, 14. However, user-directed policy at the agent component 14 may dictate how long the connection remains up/active. For example, a policy software component included in the agent component 14 may allow a user included in the private network 20 to bring the connection between the components 12, 14 up or down on demand. Since long-standing connections can be maintained by the client 16 and the agent component 14 with the server component 12, a path is available for asynchronous notifications.

The connection between the client 16 and the server component 12 is on demand from whatever network application causes the connection to be established between the client 16 and the server component 12. This connection could be long-standing or temporary as determined by the network application at the client 16. As an example of a temporary connection, a user at the client 16 can web browse the private network 20 from a web browser at the client 16. The temporary connection ceases once the user points the web browser to a web site outside the private network 20. As an example of a long-standing connection, a home security control device 22b on the private network 20 can send alerts to the client 16 at a user's workplace to notify the user that someone has broken into his or her house.

The agent component 14 is extensible to support whatever protocols may be used on the private network 20. The agent component 14 may be configured to allow access to any number of specific devices 22a-N within the private network 20.

The proxying components 9 sit between the remote networked client 16 (technically, the client's browser or other network application) and the devices 22a-N within the private network 20. The proxying components 9 can monitor and intercept any and all requests being sent to and/or received from the private network 20 and/or the Internet 18. The proxying components 9 can also provide for client-to-private-network encryption. For example, by using HTTPS from the client 16 to the server component 12 and from the agent component 14 to the server component 12 with a session key negotiated between the client 16 and the agent component 14, data transmitted to and/or from the private network 20 is only exposed at the client 16 and in the private network 20. If the client 16 trusts and verifies the identity of the server component 12, then the connection between the client 16 and a device 22 can be as secure as if the client 16 and the device 22 were directly communicating without any middlemen (the server component 12) in between.

Figure 2:
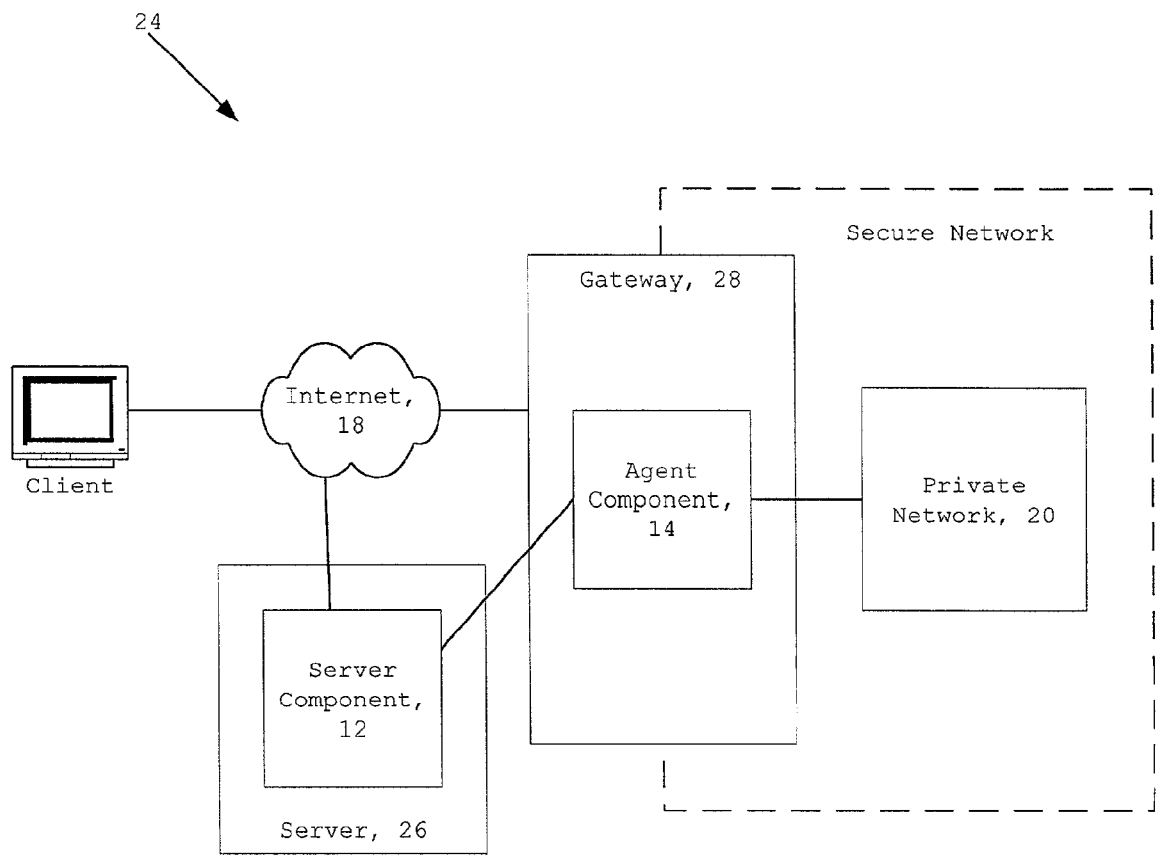

The proxying components 9 may be implemented in a number of ways. In a network arrangement 24 shown in FIG. 2, the server component 12 can be implemented on an Internet-based server 26. The agent component 14 can be implemented on a gateway 28 of the private network 20 or on a personal computer 22a included in the private network 20 (see FIG. 1). The gateway 28 links the private network 20 and the Internet 18 together. The gateway 28 can also serve as or implement a firewall, e.g., with one or both of the proxying components 9 between the networks 18, 20.

The network arrangement 24 allows an ISP or an independent Internet-based service site to provide the server component 12. An independent Internet-based service site addresses ISP restrictions on incoming connections to the private network 20.

The network arrangement 24 also provides a single point of contact for a client to the private network 20 (and additional private networks, e.g., the client may have multiple "homes," each with its own private network). Furthermore, the Internet-based server's address can be static and therefore a client knows a connection address for the private network 20 before attempting to connect to the private network 20.

Figure 3:
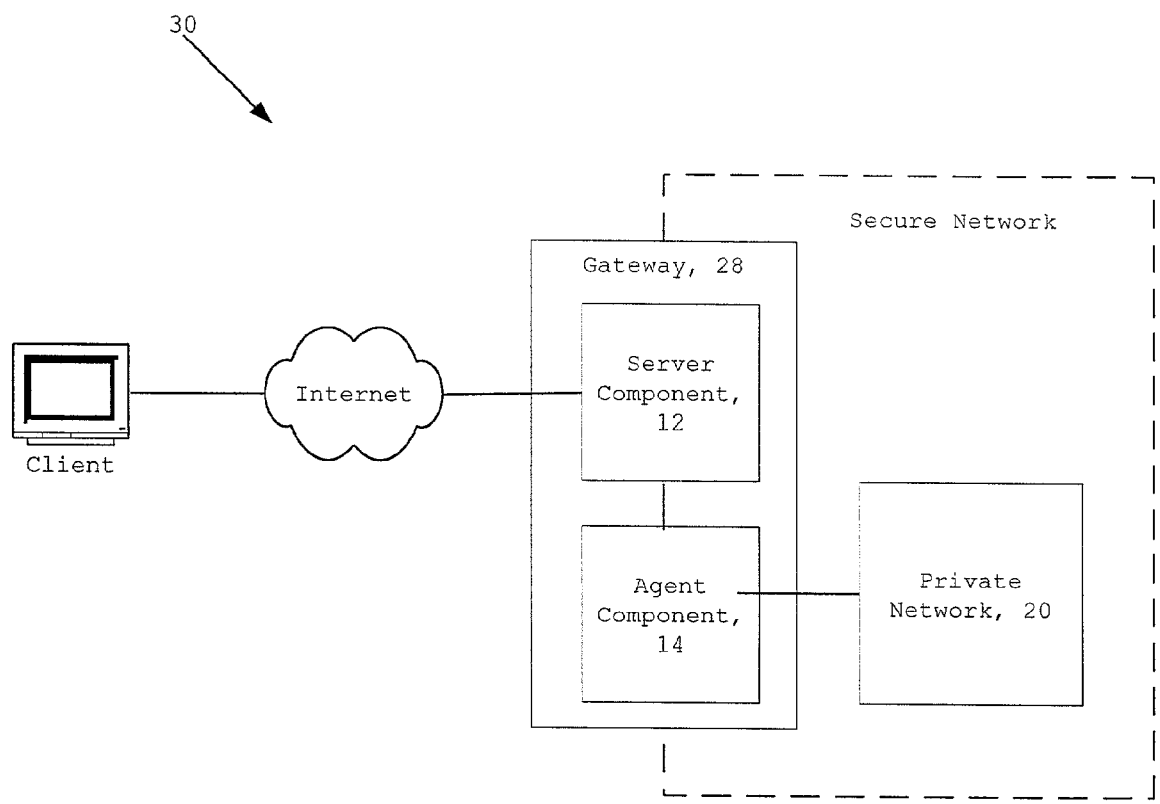

In another network arrangement 30 shown in FIG. 3, the proxying components 9 can be implemented on the gateway 28 of the private network 20. This design requires that if the private network 20 uses an ISP that the ISP allow incoming connections to the private network 20, but the gateway 28 may be provided as part of the ISP service.

Figure 4:
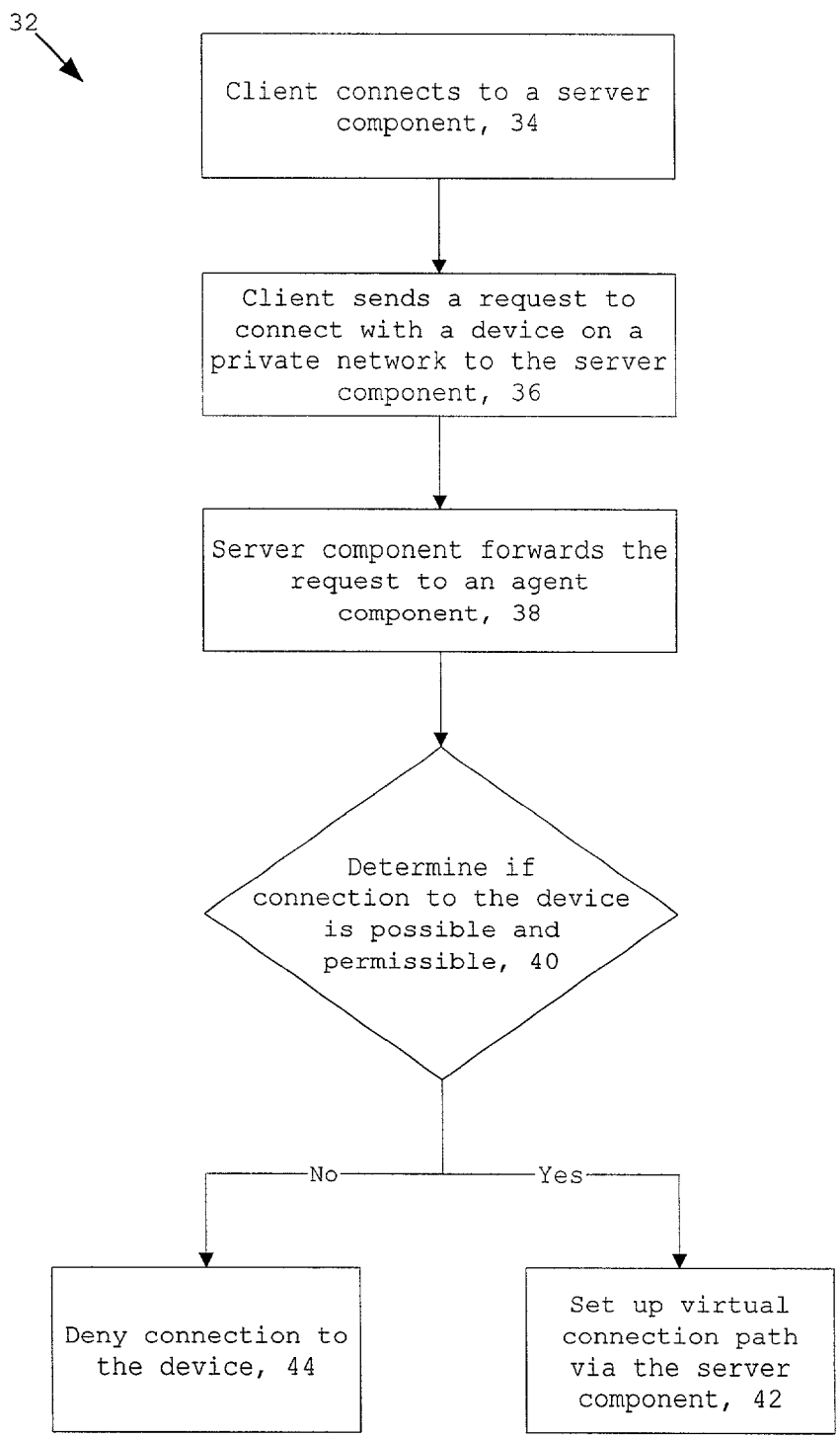
FIG. 4 is a flowchart showing a method of connecting to a private network in accordance with an embodiment of the invention.

Referring to FIG. 4, a process 32 enables the client 16 located remotely from the private network 20 to logically connect to a device 22a-N included in the private network 20 (e.g., to software applications running on the device 22a-n). When the process 32 starts, the agent component 14 has already established a connection with the server component 12 as described above. While this connection between the server component 12 and the agent component 14 exists, the process 32 can be repeatedly performed for the client 16 and for other clients. The process 32 can be implemented using software and/or hardware on the server component 12 and on the agent component 14.

The client 16 connects 34 to the server component 12. The server component 12 can supply the client 16 with information about the agent component 14 and the devices 22a-N included in the private network 20 to which the agent component 14 is connected. This information can include the names and status of available devices and applications in the private network 20. The client 16 can request a connection with a device 22a-N on the private network 20 by sending 36 a request to the server component 12. The server component 12 forwards 38 this request to the agent component 14.

The agent component 14 determines 40 if a connection to the requested device 22a-N is possible, i.e., the device 22a-N is available, and the connection is permissible, i.e., the client 16 has authorized access. The agent component 14 determines the possibility and the permissibility based on user account privileges associated with the client 16. The user account is an account configured by an administrator of the private network 20 prior to the client 16 attempting to connect to the private network 20. If the agent component 14 determines that a connection is possible and permissible, the agent component 14 sets up 42 a temporary connection, e.g., a virtual connection path, between the requested device 22a-N and the client 16 via the server component 12. If the agent component 14 determines that a connection is not possible and/or permissible, the agent component 14 denies 44 the client 16 access to the requested device 22a-N. In denying a connection, the agent component 12 may send a request-denied message to the client 16 via the server component 12.

Alternatively, the agent component 12 can forward to the server component 14 the information used to determine if a connection to the requested device 22a-N is possible and permissible, and the server component 14 can perform the determining 40. The server component 14 (or the agent component 12) may then also perform the denying 44 and the setting up 42 as appropriate.

Other embodiments are within the scope of the following claims.

What is claimed is:

1. A method to enable a device at a public network to establish a connection into a private network, the method comprising:
   establishing a persistent connection from an agent component to a server;
   receiving a request from the device across the public network at the server to establish a connection between the device and the private network;
   determining, at the server, if the device is authorized to connect with the private network;
   if authorized, forwarding the request from the server to the agent component; and
   the agent component creating a connect:ion between the private network and the device via the server, wherein the server is configured for a persistent address.

2. The method of claim 1 further comprising the agent component establishing a temporary connection between the device and a device included in the private network.

3. The method of claim 1 further comprising, if not authorized, denying the device access to the private network.

4. The method of claim 1 in which the persistent connection comprises the server and the agent component having a connection lasting as long as a mechanism at the server and agent component supporting t:he connection remains active.

5. The method of claim 1 in which the server and the device have a connection lasting as long as a mechanism at the server and a mechanism at the device supporting the connection remain active.

6. The method of claim 1 in which the determining includes authenticating a password.

7. The method of claim 1 in which the public network includes the Internet.

8. The method of claim 1 in which the agent component and the server include proxy servers.

9. The method of claim 1, further comprising establishing a connection between the device at the public network and the server after the establishing of the persistent connection from the agent component to the server.

10. The method of claim 1, further comprising establishing a connection between the private network and the agent before the establishing of the persistent connection from the agent component to the server.

11. The method of claim 1, wherein the request from the device at the public network travels from the server to the agent prior to reaching the private network.

12. An article comprising a machine-readable medium which stores machine-executable instructions, the instructions causing a machine to:
   establish a persistent connection from a second network component designated with a persistent address to a first network component;
   receive a request from a device across a public network at the second network component to establish a connection between the device and a private network;
   determine, by the second network component, if the device is authorized to connect with the private network;
   if authorized, forward the request from the second network component to the first network component; and
   create, with the first network component, a connection between the private network and the device via the second network component.

13. The article of claim 12 further comprising the first network component establishing a temporary connection between the device and a device included in the private network.

14. The article of claim 12 further comprising, if not authorized, denying the device access to the private network.

15. The article of claim 12 in which the first network component and the second network component have a connection lasting as long as a mechanism at each of the components supporting the connection remains active.

16. The article of claim 12 in which the second network component and the device have a connection lasting as long as a mechanism at the second network component and a mechanism at the device supporting the connection remain active.

17. The article of claim 12 in which the determining includes authenticating a password.

18. The article of claim 12 in which the public network includes the Internet.

19. The article of claim 12 in which the first network component and the second network component include proxy servers.

20. The article of claim 12, further comprising instructions to establish a connection between the device at the public network and the first network component after the establishing of the persistent connection from the second network component to the first network component.

21. The article of claim 12, further comprising instructions to establish a connection between the private network and the second network component before the establishing of the persistent connection from the second network component to the first network component.

22. The article of claim 12, wherein the request from the device at the public network travels from the first network component to the second network component prior to reaching the private network.

23. A system comprising:
   a server component configured to connect to a public network and determine if a device is authorized to connect with a private network; and
   an agent component configured to establish a persistent connection to the server component and to the private network, and further configured to provide the device with access to the private network via the server component and the public network, wherein the agent component is configured to connect to the server component prior to connecting to the private network, wherein the public network has a connection with the device; and wherein the server is assigned with a persistent address.

24. The system of claim 23 in which the agent component is also configured to provide any number of devices configured to connect to the public network with access to the private network via the server component and the public network.

25. The system of claim 23 in which the agent component is also configured to provide the device with access to a device included in the private network.

26. The system of claim 23 in which the server component and the agent component are both extensible to support any protocols used by the public network and by the private network.

27. The system of claim 23 in which the public network includes the Internet.

28. The system of claim 23 in which the server component is also configured to authenticate the device.

29. The system of claim 23 in which the agent component is also configured to maintain a connection with the server component as long as a mechanism at each of the components supporting the connection remains active.

30. The system of claim 23 in which the server component is also configured to maintain a connection with the device as long as a mechanism at the server component and a mechanism at the device supporting the connection remain active.

31. The system of claim 23 in which the agent component is implemented inside the private network.

32. The system of claim 23, wherein the connection between the agent and server component comprises a persistent connection.

33. The system of claim 23, wherein the agent component is implemented within a residential gateway.

34. The system of claim 33, wherein the server component is implemented within a residential gateway.

35. The system of claim 34, wherein the private network comprises a secured network.

* * * * *